March 14, 1961     G. A. HAGELTHORN     2,974,676
HOSE AND CONDUIT SYSTEM
Filed Feb. 17, 1959     2 Sheets-Sheet 1
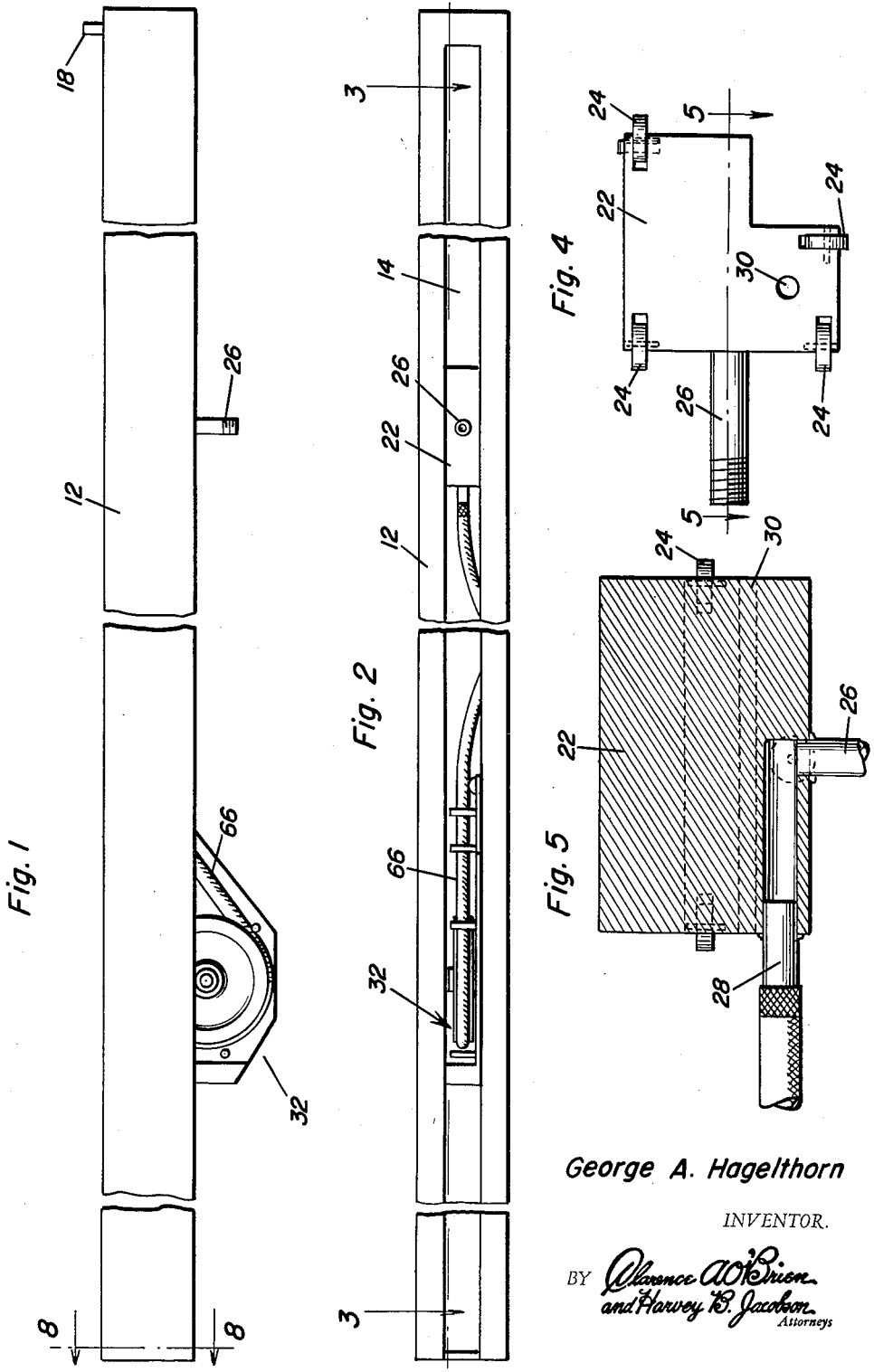
George A. Hagelthorn
INVENTOR.

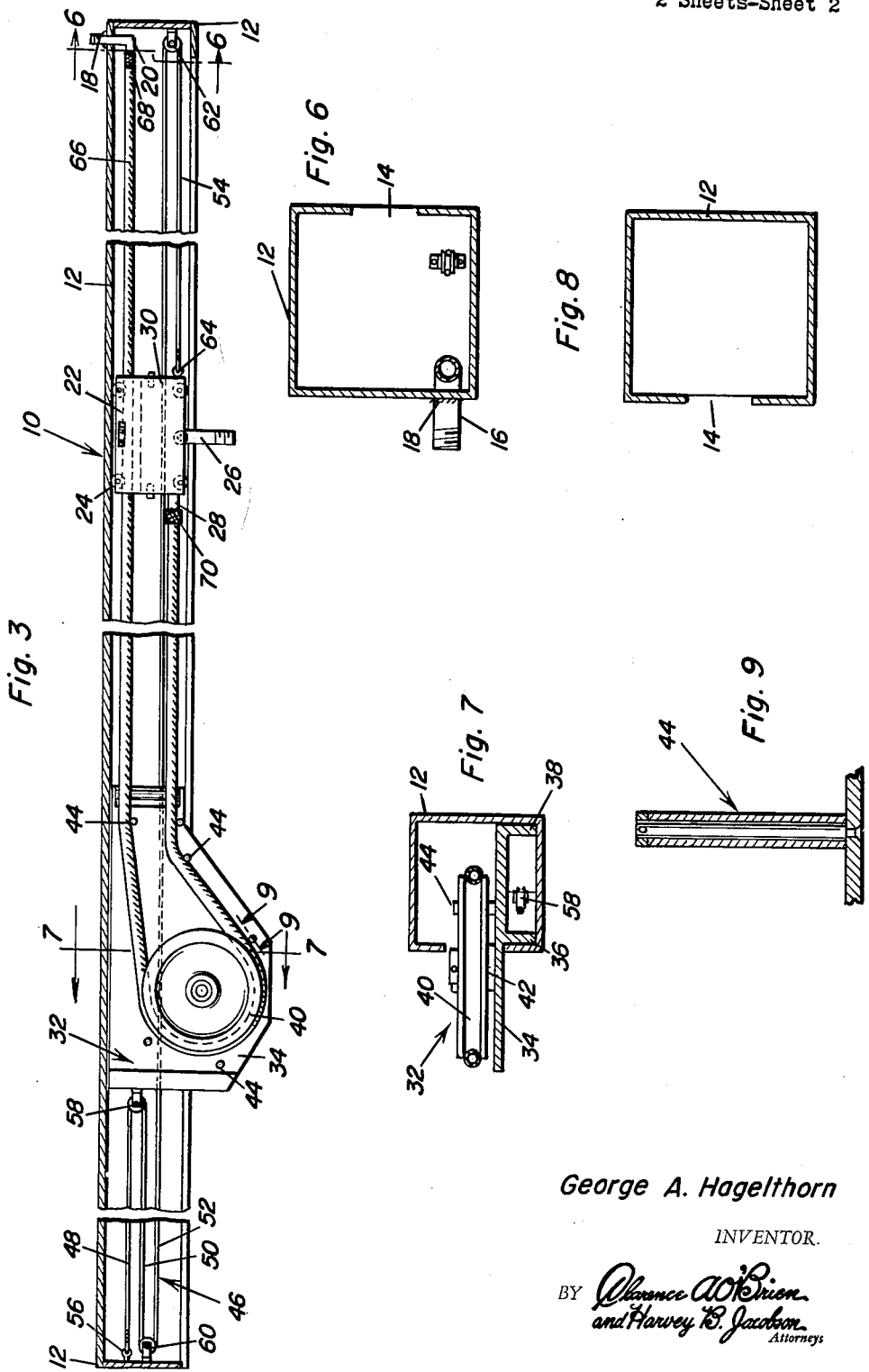

United States Patent Office 2,974,676
Patented Mar. 14, 1961

2,974,676
HOSE AND CONDUIT SYSTEM

George A. Hagelthorn, 348 Rosslyn Drive, West Palm Beach, Fla.

Filed Feb. 17, 1959, Ser. No. 793,907

3 Claims. (Cl. 137—343)

This invention relates generally to a system for controlling, conveying, and positioning a hose and discharge point thereof wherein the hose is maintained in a safe and orderly fashion.

In the utilization of pneumatic hose employed in conjunction with pneumatic equipment, the hose generally is suspended in a loop arrangement from an I beam so that the hose discharge point may be moved in accordance with the positioning of various air lifts. The loop arrangement presently employed is clumsy and cumbersome and it has been found that the hose does not follow the trolley. Further, the system is inadequate because it has proven to be unsafe in that the hose may be severed or it may break loose from a coupling whereby a dangerous instrument will be released as the hose whips through the air motivated by escaping conveyed compressed gas.

It is one of the primary objects of this invention to provide an orderly method of handling any fluid conveying flexible hose between the connection at the supply point and the connection at the discharge point where the equipment is being served.

It is a further object of this invention to so control the hose by confining the hose within a conduit system at all times during the operation.

Further, the invention provides means for positioning the hose within the conduit according to the location requirements of the equipment being served. The hose discharge point is free to move along the complete length of the conduit while the interior components within the conduit assure the orderly handling of the hose between the hose inlet and hose discharge point. The invention finds particular utility when employed for supplying compressed air to overhead air motor hoists and propulsion air motors. However, the teachings of this invention apply equally well to the control of any fluid conveying flexible hose.

A still further object of this invention is to provide a novel system wherein a hose length is confined within a conduit so as to remove unsightly exposed and disorderly loops of hose which are prone to catch and snag. It will be apparent that the conduit will provide a protective housing for the hose eliminating somewhat the corrosive effects of heat and fumes which may be present.

In accordance with the above stated objects, below is described the novel system for controlling the conveyance of a discharge point of a hose wherein the hose wherein the hose is maintained in a safe orderly fashion. The components of the system include the conduit, a length of flexible hose, a hose carrier, a hose guide, and a cable control system connecting the hose guide and hose carrier for maintaining desired relative positioning therebetween.

Other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational plan view of the conduit system comprising this invention;

Figure 2 is an elevational rear view of the system comprising this invention;

Figure 3 is a sectional view taken substantially along the plane 3—3 of Figure 2;

Figure 4 is an elevational end view of the hose carrier forming a component of the system of the invention;

Figure 5 is a sectional view taken substantially along the plane 5—5 of Figure 4;

Figure 6 is a sectional view taken substantially along the plane 6—6 of Figure 3;

Figure 7 is a sectional view taken substantially along the plane 7—7 of Figure 3;

Figure 8 is a sectional view taken substantially along the plane 8—8 of Figure 1; and Figure 9 is a sectional view taken substantially along the plane 9—9 of Figure 3.

With continuing reference to the drawings, numeral 10 generally represents the conduit system comprising this invention and including a substantially square conduit 12 having an elongated rear opening 14. It is contemplated that the conduit be manufactured of heavy gauge steel or extruded aluminum. However, the measurements of the conduit and particular material utilized would vary depending on the size of the hose employed in the particular system. Design requirements would dictate the particular dimensions and configurations of the conduit along with the various components utilized. Still further, the flexible hose employed herein is a conventional hose capable of conveying the pressurized fluids required. Standard hose fittings and couplings may be utilized without exception. A hose inlet pipe 16 is fixed as by welding as at 18 to the conduit 12 and terminates in an elbow portion as illustrated at 20.

An initial system component is illustrated in Figure 4 wherein the hose carrier 22 supporting a plurality of rotatable wheels 24 is shown carrying the hose discharge pipe 26 which communicates with a right angle pipe portion 28 to be utilized in a manner more specifically disclosed below. It is to be noted at this time that an aperture 30 runs through the length of the hose carrier 22. Particularly referring to Figure 3, it is noted that the hose carrier 22 is positioned within the conduit 12 whereby the various wheels 24 contact the conduit sides allowing the hose carrier 22 to move within the conduit. The discharge pipe 26 extends rearwardly through the elongated opening 14 in the conduit 12.

A second basic component of the system includes a hose guide 32 comprising a base member 34 having depending leg portions 36 and 38. The hose guide 32 is adapted to move along the conduit on sliding legs 36 and 38. Of course, any means may be utilized to provide a movable relationship between the conduit 12 and hose guide 32. For instance, wheels, as illustrated at 24 in connection with the hose carrier 22, may be employed. A pulley 40 is rotatably supported on vertical axis 42 mounted on base 34. The pulley 40 extends rearwardly from the conduit 12 through the elongated opening 14. A plurality of roller guides 44 are positioned on the base 34 for guidance purposes to be more clearly comprehended below.

A further basic component of the conduit system includes the cable control system which provides connection between the hose carrier 22 and the hose guide 32. The cable control system includes initially a cable 46 having sections 48, 50, 52, and 54. A hook 56 is secured to a portion of the conduit 12 and fastens one end of the cable 46 thereto. Section 48 of the cable 46 then proceeds around a pulley 58 carried by hose guide 32, through section 50 around a pulley 60 fixed to the conduit 12, through section 52 passing below the base 34 of hose guide 32 and through aperture 30 of hose carrier 22, around pulley 62 fixed to the conduit 12 at an end remote from the point where pulley 60 is fixed, through section 54 to hook 64 fixed to the hose carrier 22. The manner in which the control cable system operates will be more fully discussed below.

A flexible hose 66 is coupled to the hose inlet 16 in a conventional manner at 68. The hose 66 proceeds through the conduit around guide rollers 44 and around the pulley 40 of hose guide 32 and is coupled to the pipe section 28 at coupling 70.

In the operation of this system, for instance when used in conjunction with an overhead air motor hoist on a monorail, the conduit is constructed so as to be equal in length to the service distance of the monorail. The conduit suspension is parallel to the monorail and is preferably supported from brackets as by welding. When attaching the discharge point 26 of the system to the service inlet of a hoist being served, a standard flexible hose of a proper length to provide a loop between the conduit discharge and service inlet is utilized. In order to prevent any force from being transmitted along this connecting hose, a cable or chain of shorter length than the connecting hose is utilized between the service inlet and the hose carrier 22. It will be apparent that since the cable or chain is of shorter length than the connecting hose, it will transmit any force induced by any relative movement by the service inlet to the hose carrier and no force will be transmitted through the connecting hose. Referring to Figure 3, assuming that a force to the right is transmitted to the hose carrier 22. The force will be transmitted from the hose carrier 22 along the hose 66 to the pulley 40 and axis 42 thereof. As the hose carrier 22 moves a particular distance to the right, the hose guide 32 will move half that distance to the right. Of course, as hose carrier 22 moves to the right the hook 64 attached thereto moves to the right and cable will pass through pulley 62 and pulley 60 to compensate for pulley 58 moving to the right. It should be apparent that therefore as the hose discharge point 26 moves to the right, the hose length 66 will be maintained in a safe orderly fashion about the pulley 40 and the hose 66 will not tend to loop, gather, or bunch to impede movement. If now, a force is transmitted to the hose carrier 22 such that the hose discharge point 26 must move to the left, a force will be transmitted through section 54 of cable 46. The force transmitted through the cable 46 will pull the pulley 58 to the left and thereby of course carry the hose guide 32 to the left. Again, it will be apparent that the hose length 66 will remain in orderly fashion. It should further be apparent that the hose guide 32 moves half the distance of the hose carrier 22 in either direction. It should be apparent therefore that herein has been disclosed a novel system for controlling the conveyance of a discharge point of a hose whereby the hose is maintained in a safe orderly fashion. Further, one skilled in the art should realize that the hose is maintained in a safer more operative condition thereby minimizing expense and improving safety conditions.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A novel system for controlling the conveyance of a discharge point of a hose wherein the hose is maintained in a safe orderly fashion comprising a conduit having a rectangular cross-section, a hose carrier in said conduit including a base member, a pair of legs projecting laterally from said base member and slidably engaged in said conduit, a hose guide in said conduit movable with respect thereto, means connecting said hose guide to said hose carrier for relating their respective movements, said means including a cable control system, said cable control system including a first pulley, a second pulley, a third pulley, said first pulley secured to said hose guide, said second pulley secured to said conduit, said third pulley secured to said conduit, a cable secured at one end to said conduit, said cable passing around said first, second and third pulleys respectively, said cable secured at a second end to said hose carrier, a hose inlet supported by said conduit, a fixed length of hose in said conduit, said hose fixed at one end to said hose inlet, said hose fixed at a second end to said hose carrier, said hose guide including a pulley, said hose being looped around said pulley, guide rollers supported in said conduit adjacent said hose guide pulley for maintaining said hose on said hose guide pulley, rotatable wheels carried by said hose carrier and engaged with said conduit for facilitating movement of said hose carrier.

2. A novel system for controlling the conveyance of a discharge point of a hose wherein the hose is maintained in a safe orderly fashion comprising a conduit having a rectangular cross-section, a hose carrier in said conduit movable with respect thereto, a hose guide in said conduit including a base member, a pair of legs projecting laterally from said base member and slidably engaged in said conduit, means connecting said hose guide to said hose carrier for relating their respective movements, said means including a cable control system, said cable control system including a first pulley, a second pulley, a third pulley, said first pulley secured to said hose guide, said second pulley secured to said conduit, said third pulley secured to said conduit, a cable secured at one end to said conduit, said cable passing around said first, second and third pulleys repsectively, said cable secured at a second end to said hose carrier, a hose inlet supported by said conduit, a fixed length of hose in said conduit, said hose fixed at one end to said hose inlet, said hose fixed at a second end to said hose carrier, said hose guide including a pulley, said hose being looped around said pulley, guide rollers supported in said conduit adjacent said hose guide pulley for maintaining said hose on said hose guide pulley, rotatable wheels carried by said hose carrier and engaged with said conduit for facilitating movement of said hose carrier, said hose carrier including said hose discharge point.

3. A novel system for controlling the conveyance of a discharge point of a hose wherein the hose is maintained in a safe orderly fashion comprising a conduit, a hose carrier in said conduit movable with respect thereto, a hose guide in said conduit movable with respect thereto, means connecting said hose guide to said hose carrier for relating their respective movements, said means including a cable control system, said cable control system including a first pulley, a second pulley, a third pulley, said first pulley secured to said hose guide, said second pulley secured to said conduit, said third pulley secured to said conduit, a cable secured at one end to said conduit, said cable passing around said first, second and third pulleys respectively, said cable secured at a second end to said hose carrier, a hose inlet supported by said conduit, a fixed length of hose in said conduit, said hose fixed at one end to said hose inlet, said hose fixed at a second end to said hose carrier, said hose guide including a pulley, said hose being looped around said pulley, guide rollers supported in said conduit adjacent said hose guide pulley for maintaining said hose on said hose guide pulley, rotatable wheels carried by said hose carrier and engaged with said conduit for facilitating movement of said hose carrier, said hose carrier including said hose discharge point, said conduit having an elongated opening, said opening accommodating said hose discharge point, said conduit being rectangular in cross-section, said hose guide including a base member upon which said hose guide pulley is supported, and a pair of legs projecting laterally from said base member and slidably engaged with said conduit.

References Cited in the file of this patent

UNITED STATES PATENTS

| | | |
|---|---|---|
| 467,746 | Brown | Jan. 26, 1892 |
| 2,395,485 | Jones | Feb. 22, 1946 |